Patented Apr. 3, 1928.

1,664,777

UNITED STATES PATENT OFFICE.

SHINJIRO HORII, OF KANDA-KU, TOKYO, JAPAN.

STENCIL SHEET.

No Drawing.    Application filed January 14, 1927. Serial No. 161,247.

My invention relates to improvements in stencil sheets of the kind used for duplicating manuscript and type-written documents, drawings and the like, and consists of a sheet of fibrous material coated or impregnated with a composition including esters of polysaccharides and alcohols obtained from oils and waxes of marine animals, or fishes. The alcohols preferably used are such as oleic alcohol, selachyl alcohol, and cetyl alcohol. Oleic alcohol ($C_{18}H_{36}O$) and selachyl alcohol ($C_{20}H_{40}O_3$)—the name is given by Dr. Tsujimoto—occur in sperm oil, bottle nose oil and some fish oils, and may be isolated from the unsaponifiable matter of the above oils or waxes.

It has previously been proposed to provide a stencil sheet of this kind, such as a base of fibrous paper, coated or impregnated with a composition including a cellulose ester, such as cellulose nitrate or acetate, being dissolved in a volatile solvent, such as amyl acetate, and a tempering agent, such as castor oil. Such a stencil sheet however has the disadvantage of being sticky on handling and lacks softness to produce a clear stencil by the abrasion of a stylus, or by the blow of the type of a type-writing machine.

According to the present invention, the coating of the stencil sheet, including esters of polysaccharides and the alcohols obtained from oils and waxes of marine animals or fishes, forms a homogeneous mixture which remains soft and flexible unchanged throughout an extended period of time, and produces a clear impression thereon either by the pressure of a hand stylus or the type of a type-writing machine.

In the practice of the invention, a sheet of fibrous material, such as yoshino paper, is coated or impregnated with a compound prepared by the mixing together of a solution of esters of polysaccharides, such as cellulose nitrate, cellulose acetate and mannan acetate, in a suitable solvent, such as acetone, methyl alcohol, amyl alcohol or amyl acetate, with alcohols obtained from marine animal oils, or waxes, such as oleic alcohol, selachyl alcohol, with or without a tempering agent consisting of fatty or waxy materials such as fatty oils, fats, fatty acids, waxes and naphthene alcohols. Naphthene alcohol is obtained by naphthenic alkyl esters being reduced by means of metallic sodium. If desired, instead of the paper being coated with the composition, the latter may be added to the paper stuff in a mixing hollander.

The proportions of the ingredients of the composition may vary depending on various circumstances, an example being as follows:—

|  | Parts by weight. |
|---|---|
| Cellulose nitrate | 5 |
| Acetone | 20 |
| Methyl alcohol | 20 |
| Amyl acetate | 40 |
| Amyl alcohol | 15 |
| Oleic alcohol | 25 |
| Fatty oil | 3 |

The term "esters of polysaccharides" is intended to include not only one of definite esters of polysaccharides, but also a mixture of them.

What I claim is:—

1. Stencil sheet comprising a base of fibrous material impregnated with a mixture of a solution of esters of polysaccharides in a suitable solvent and alcohols obtained from oils and waxes of marine animals or fishes.

2. Stencil sheet comprising a base of fibrous material impregnated with a mixture of a solution of esters of polysaccharides in a suitable solvent, alcohols obtained from oils and waxes of marine animals or fishes, and a tempering agent.

3. Stencil sheet comprising a base of fibrous material impregnated with a mixture of a solution of esters of polysaccharides in a suitable solvent, alcohols obtained from oil and waxes of marine animals or fishes, and fatty oils.

In testimony whereof I affix my signature.

SHINJIRO HORII.